United States Patent [19]
Moorman

[11] 3,726,575
[45] Apr. 10, 1973

[54] APPARATUS FOR CONTROLLING SHAFT END PLAY

[75] Inventor: Earl J. Moorman, Dayton, Ohio

[73] Assignee: General Motors Corporation, Detroit, Mich.

[22] Filed: July 19, 1971

[21] Appl. No.: 163,778

[52] U.S. Cl..................................308/135, 310/90
[51] Int. Cl................................................F16c 17/04
[58] Field of Search..........................310/90, 229; 308/135

[56] References Cited

UNITED STATES PATENTS

3,298,756   1/1967   Wilson.................................308/135

FOREIGN PATENTS OR APPLICATIONS

1,144,902   4/1957   France.................................310/90

Primary Examiner—D. F. Duggan
Attorney—Frank J. Soucek et al.

[57] ABSTRACT

An apparatus for controlling shaft end play including a bearing mounted within a housing and a shaft rotatably supported by the bearing wherein an end portion of the shaft extends beyond the bearing within the housing. A circumferential groove in the shaft end portion receives radially inwardly extending teeth of a flat washer secured to the housing. The washer is retained adjacent its outer periphery by means of a spring ring engaging the housing. End play of the shaft is limited in either axial direction by engagement of the circumferential groove with the inwardly extending teeth of the secured washer. The washer can be designed to have any desired resistive force thereby providing a predetermined amount of axial shaft end play.

1 Claim, 3 Drawing Figures

PATENTED APR 10 1973

3,726,575

INVENTOR.
Earl J. Moorman
BY
C.L. Engle
ATTORNEY

APPARATUS FOR CONTROLLING SHAFT END PLAY

The subject invention relttes to limiting axial end play of an operating shaft and more specifically relates to utilization of a washer engaging a circumferential groove in the shaft to provide the regulated axial movement.

In the manufacure of rotating equipment having two or more bearings such as in dynamoelectric machines, it has been the practice to limit axial end play of the shaft mounted in the bearings by holding it with fixed washers or shims. It is difficult to hold the end play of the shaft within desirable limits because of the trial and error approach required where washers are used to engage shoulders machined in the shaft. An alternative method has included providing a spring force against one end of the rotating shaft. The variance of the spring force on the end of a shaft taken in conjunction with tolerances existing in the supporting bearings has provided less than precise results. Since the occurrence of extreme shaft end play creates operational difficulties such as with precise seal structures, it is desirable to limit the end play within a predetermined range. It is therefore a purpose of this invention to provide a relatively simple structure for maintaining the end play within controlled limits. This purpose is accomplished through utilization of minimum additional components and modifications as applied to existing electrical motor or dynamoelectric machine structures.

A general object of this invention is the provision of a simply constructed end play controlling apparatus wherein shaft end play can be controlled in a predetermined manner.

Another object of this invention is the provision of a slightly modified output shaft engaged by a washer mounted within a housing supporting the shaft, the washer limiting axial movement of the shaft in either direction.

A further object of this invention is the provision of a housing containing a bearing supporting a shaft, the latter having a circumferential groove in an exposed end portion wherein a washer comprising radially inwardly extending teeth is positioned with the teeth extending into the circumferential groove while the outer peripheral portions of the washer are secured to the housing.

A still further object of this invention is the provision of a housing containing a bearing assembly rotatably supporting a shaft, the shaft containing a circumferential groove receiving radially inwardly extending teeth of a spring washer, the outer periphery of which is secured in the housing whereby the teelh engage the groove limiting movement of the housing relative to the shaft in either axial direction.

Figure 1:
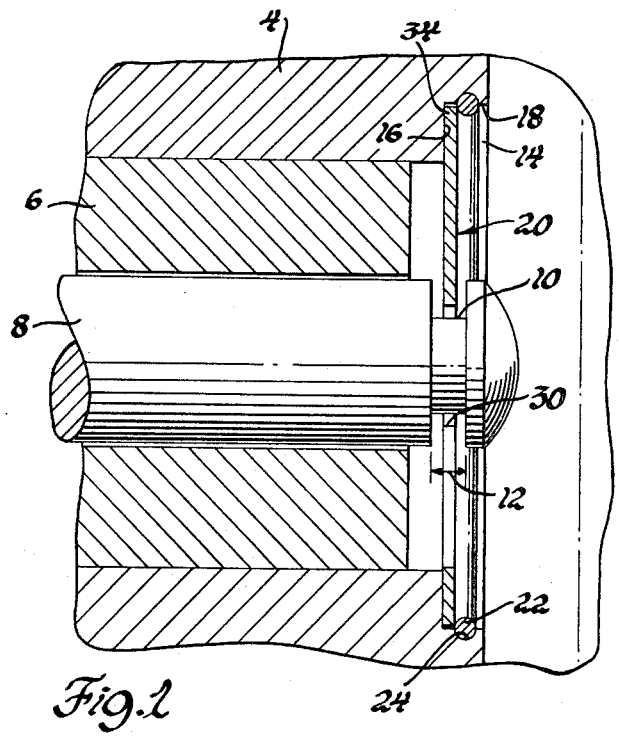
FIG. 1 is a side elevational view partially in section illustrating a shaft rotatably mounted in a housng and bearing assembly and cooperating with end play regulating means mounted in the housing
Figure 2:
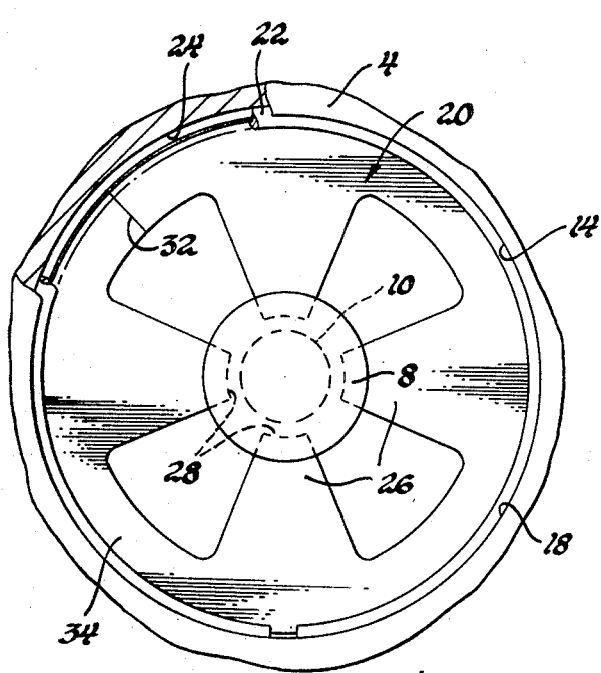
FIG. 2 is a plan view of an end play regulating washer configured to engage a circumferential groove in the rotating shaft.

With reference now to FIG. 1, a housing 4 supports a bearing assembly 6 receiving a rotatable shaft 8. It can readily be appreciated that the housing 4 can be of any form containing the bearing 6 and rotatably supporting shaft 8. A preferred use of this invention is in association with a relatively high speed electric motor shaft. Of course the shaft 8 could be fixed and the bearing assembly in the housing 4 could be rotating as a unit relative to the shaft and still be within the scope of the subject invention.

The shaft 8 contains circumferential groove 10 having a predetermined width 12 for a later specified prposet The housing 4 is machined to include an annular cutout portion 14 defining a radially tending surface 16 and an axially extending surface 18. A washer 20 is positioned in engagement with the radially extending surface 16 and is retained thereagainst by a spring ring 22 which is continually radially outwardly biased into engagement with an annular groove 24 in the axially extending surface 18 in the housing 4.

Figure 3:
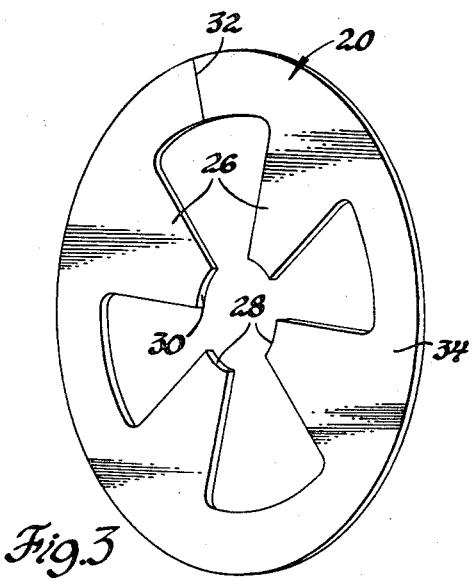
FIG. 3 is a perspective view of the washer employed in this invention.

The washer 20 includes a plurality of radially extending teeth 26 best illustrated in FIG. 3. The teeth 26 terminate in arcuate segments 28 defining an aperture 30 having a predetermined dimension. The washer 20 also includes a radial split 32 providing for assembly of the washer upon the shaft 8 whereby the teeth extend within the circumferential groove 10 as illustrated in FIG. 1. While the washer is shown to include four radially inwardly extending teeth 26, it is apparent that any number of such teeth could be provided.

In operation, with the washer 20 assembled upon the shaft 8 as shown in FIG. 1, the teeth 26 extend within slot 10 a sufficient degree to assure engagement of the edges of the slot 10 with the teeth during axial movement of the shaft in either direction. With the shaft rotating at a relatively high speed or in a situation where the housing 4 is rotating relative to the shaft 8, axial movement of the housing and the bearing assembly 6 relative to the shaft 8 causes engagement from the slot 10 with the teeth 26 of washer 20. The washer 26 provides a resistive force against such movement due to the securing of its peripheral portions 34 against the radially extending surface 16 by the split spring ring 22. The thickness of the washer 20 in combination with the type of metal utilized and subsequent heat treatment thereof can precisely regulate the amount of end play allowed during operation of the motor assembly. In the case where it is desired to limit the axial end play of the shaft to a small amount, the washer 20 would be fabricated either of thicker material or of material heat treated to provide a stiffer resistive force against movement of the shaft when the teeth 26 are engaged by the notch 10 in the shaft 8. Additionally, the width of the circumferential groove 10 can be conformed to snugly receive the teeth 26 such that there would be little or no clearance between the shaft and the washer so that axial movemnt of the shaft 8 will be under the precise control of the spring force provided in the teeth 26.

From the above description it is apparent that the spring 20 can be configured to provide any desired force thereby regulating the amount of axial end play in the shaft 8. It is also apparent that washer 20 can include any number of teeth 26 as compared to the use of four as disclosed for purpose of illustration only. Additionally, it is obvious that the thickness of the washer 20 can be varied in conjunction with he type of material ueed to provide the desired resistive force.

While a preferred embodiment of the washer 20 has been disclosed and the means of securing the washer within the housing has been specifically described relative to a single conventional means of accomplishing this result, it is obvious that the washer can be secured to the housing in any efficient manner. The mode of securing the washer within the housing is not deemed to be a part of this invention.

While a preferred embodiment has been described for purposes of illustration, it is not intended to limit the scope of this invention except as required by the following appended claims.

What is claimed i:

1. In combination a housing, a bearing mounted in said housing, a shaft rotatably supported by said bearing, an end portion of said shaft extending beyond said bearing in an outwardly direction relative to said housing, said end portion having a circumferential groove of a specified width therein, a spring washer having a predetermined spring coefficient including radially extending substantially spaced teeth defining a centrally located aperture of a predetermined diameter, said radially inwardly extending teeth comprising predetermined dimensions and a specified space therebetween so as to provide a specified spring resistive force in an axial direction perpendicular to the plane of the surface of said washer, said radially inwardly extending teeth being received in the circumferential groove of said shaft, a stepped end surface in said housing, a radially extending inwardly disposed end face defined by said step engaging a portion of the outer periphery of said washer, a circumferential surface defined by the axially extending portion of said step having a circumferential groove therein, and a locking ring spring biased into said groove engaging said outer peripheral portions of said washer thereby retaining the latter in place relative to said housing whereby axial end play of said shaft causes said circumferential groove to engage the radially inwardly extending teeth of said washer such that the end play is maintained within predetermined limits in both axial directions due to the spring coefficient and spacing of the teeth as well as the width of the shaft end portion groove.

* * * * *